(12) United States Patent
Bodet et al.

(10) Patent No.: US 11,970,329 B2
(45) Date of Patent: Apr. 30, 2024

(54) HOUSING FOR A PRESSURIZED CONTAINER

(71) Applicant: LINDAL FRANCE SAS, Val de Briey (FR)

(72) Inventors: Hervé Bodet, Verdun (FR); Eric Gaillard, Dieue-sur-Meuse (FR)

(73) Assignee: LINDAL FRANCE SAS, Val de Briey (FR)

( * ) Notice: Subject to any disclaimer, the term of this patent is extended or adjusted under 35 U.S.C. 154(b) by 626 days.

(21) Appl. No.: 17/260,785

(22) PCT Filed: Jul. 15, 2019

(86) PCT No.: PCT/EP2019/069053
§ 371 (c)(1),
(2) Date: Jan. 15, 2021

(87) PCT Pub. No.: WO2020/016199
PCT Pub. Date: Jan. 23, 2020

(65) Prior Publication Data
US 2021/0292080 A1    Sep. 23, 2021

(30) Foreign Application Priority Data

Jul. 18, 2018 (FR) ....................... 1856672

(51) Int. Cl.
*B65D 83/42* (2006.01)
*B05B 11/00* (2023.01)
(Continued)

(52) U.S. Cl.
CPC .......... *B65D 83/42* (2013.01); *B05B 11/0056* (2013.01); *B29D 22/003* (2013.01);
(Continued)

(58) Field of Classification Search
CPC .......... B65D 83/42; B65D 1/06; B65D 83/38; B65D 11/1873; B65D 25/2897;
(Continued)

(56) References Cited

U.S. PATENT DOCUMENTS 3,131,828 A   5/1964   Waldherr
3,356,257 A   12/1967  Eimer
(Continued)

FOREIGN PATENT DOCUMENTS

EP   2998241 A1   3/2016
FR   2789662 A1   8/2000
(Continued)

OTHER PUBLICATIONS

International Search Report and Written Opinion dated Oct. 16, 2019 in corresponding application No. PCT/EP2019/069053; w/ English partial translation and partial machine translation (total 29 pages).

*Primary Examiner* — Shawn M Braden
(74) *Attorney, Agent, or Firm* — Seckel IP, PLLC

(57) ABSTRACT

A housing (1, 1') for a pressurized container, has a bottom (12, 12') a stopper, sealing means (124, 124') to ensure sealing between the stopper (2, 2') and the housing (1, 1') when the housing is provided with a stopper; and retaining means (126, 126') to retain, when the container is pressurized, a stopper (2, 2') closing the opening. The retaining means (126, 126') are distinct from the stopper (2) and are in an inactive initial form (125, 126) and must, in order to fulfill their function, be activated (126, 126') after the opening has been closed by a stopper.

28 Claims, 2 Drawing Sheets

(51) Int. Cl.
*B29D 22/00* (2006.01)
*B65D 1/06* (2006.01)
*B65D 83/38* (2006.01)
*B29K 101/12* (2006.01)

(52) U.S. Cl.
CPC ............... *B65D 1/06* (2013.01); *B65D 83/38* (2013.01); *B29K 2101/12* (2013.01)

(58) Field of Classification Search
CPC ............ B05B 11/0056; B05B 11/0037; B29D 22/003; B29K 2101/12
See application file for complete search history.

(56) References Cited

U.S. PATENT DOCUMENTS

| | | | |
|---|---|---|---|
| 3,422,837 A | | 1/1969 | Boyer et al. |
| 4,658,979 A | * | 4/1987 | Mietz ..................... B65D 83/42 |
| | | | 141/3 |
| 4,685,597 A | | 8/1987 | Katsumi |
| 4,993,602 A | * | 2/1991 | Casey .................... B65D 83/70 |
| | | | 137/859 |
| 5,279,907 A | * | 1/1994 | Paterek ................ B65D 77/225 |
| | | | 29/623.2 |
| 5,944,211 A | * | 8/1999 | Woodnorth ........ B65D 81/2038 |
| | | | 220/806 |
| 8,925,579 B2 | * | 1/2015 | Weaver ............... B65D 77/225 |
| | | | 137/225 |

FOREIGN PATENT DOCUMENTS

| | | |
|---|---|---|
| GB | 1311940 A | 3/1973 |
| JP | H03-162273 A | 7/1991 |

\* cited by examiner

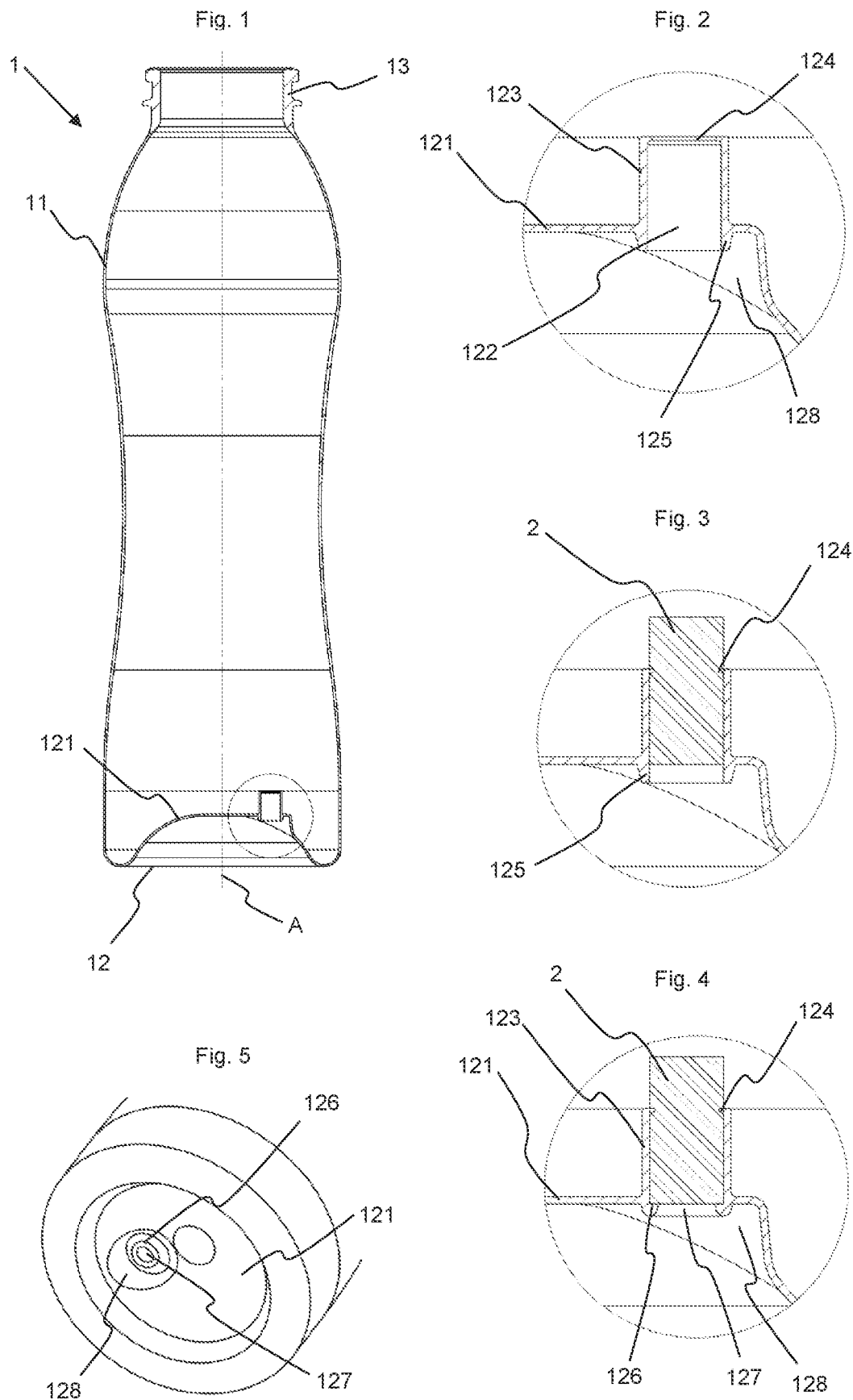

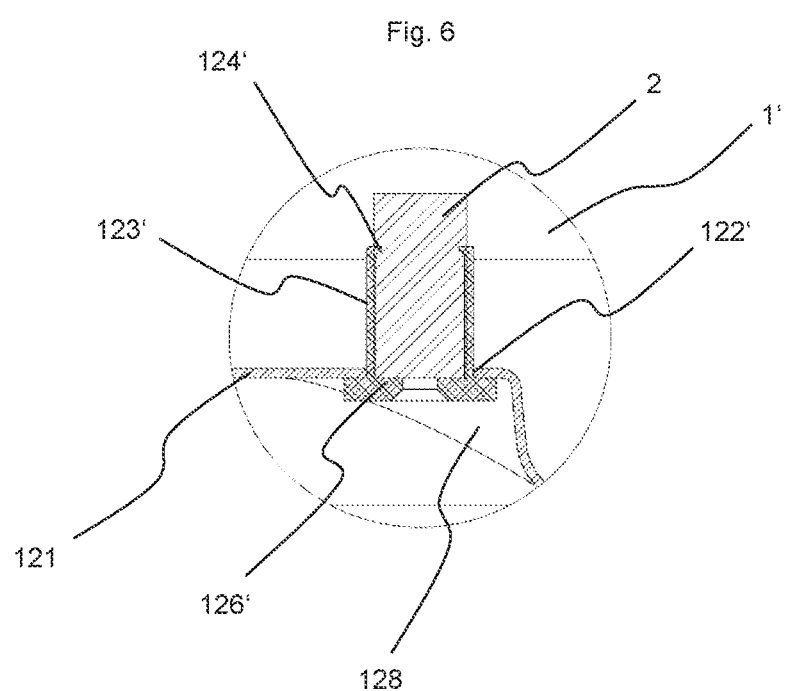

HOUSING FOR A PRESSURIZED CONTAINER

The invention relates to a housing for a pressurized container such as an aerosol dispenser or a dispenser of pasty products.

An objective of the invention is to provide a housing, in particular in plastic material, which can be pressurized via a pathway other than the valve.

According to the invention, the housing is constituted in particular by a bottom comprising an opening intended to be closed directly or indirectly by a stopper, sealing means to ensure sealing between the stopper and the housing when the housing is provided with a stopper, and retaining means to retain, when the container is pressurized, a stopper directly or indirectly closing said opening. The retaining means are distinct from the stopper and are in an inactive initial form and must, in order to fulfill their function, be activated after the opening has been closed directly or indirectly by a stopper. Although the sealing means and the retaining means can be coincident, they are preferably distinct.

The retaining means are preferably placed on the face of the bottom located outside the housing, both before and after their activation.

In a preferred variant of the invention, the opening comprises a hole preferably surrounded by a channel extending toward the inside and/or toward the outside of the housing.

The seal between the stopper and the housing can be made by mounting the stopper with a tight fit in the opening, in particular in the hole and/or in the channel. It is also possible, instead of and/or in addition to mounting with a tight fit, to make the sealing means in the form of a sealing rib placed in the channel, in particular at the end of the channel located the most toward the inside of the housing, or at the hole.

The retaining means can be constituted by a deformation zone placed in the extension of the opening, on the side of the face of the bottom oriented toward the outside of the housing. The deformation zone is designed to be deformed, after introduction of a stopper into the opening, to form an abutment surface for the stopper to prevent the latter from moving toward the outside of the housing. Another solution consists in making the retaining means in the form of a washer intended to be fixed, preferably welded, to the housing in the extension of the opening on the side of the face of the bottom oriented toward the outside of the housing after introduction of a stopper in the opening. The washer is designed to form, after being fixed to the housing, an abutment surface for the stopper to prevent the latter from moving toward the outside of the housing. In the case of the washer, the retaining means constitute a separate part before they are fixed to the bottom of the housing. The deformation of the deformation zone or the fixing of the washer to the housing constitutes the activation of the retaining means.

Usually, the opening is provided with a stopper and it is the housing/stopper assembly that is used in the manufacture of a pressurized container. The deformation zone is preferably deformed directly after introduction of the stopper, forming an abutment surface for the latter. When the stopper is introduced directly into the hole, the opening is closed directly by the stopper.

In another variant embodiment, the opening comprises a hole and the housing comprises a preassembled unit separate from the housing, and intended to be introduced into the hole and to be fixed, preferably welded, to the housing. The preassembled unit is constituted by a channel, provided with sealing means and retaining means, and a stopper introduced into the channel and cooperating with the sealing means and the retaining means. The retaining means can include a fixing surface for fixing the preassembled unit to the housing. Activation of the retaining means is made by fixing the preassembled unit to the housing. In this variant embodiment, the opening is closed indirectly by the stopper due to the interposition of the channel. The preassembled unit is initially a separate part before it is fixed to the housing. It can be put in place during manufacture of the housing, or after filling the container and before it is pressurized. In the latter case, the conditioner receives, on the one hand, a housing provided with an opening, and on the other hand, a preassembled unit ready to be introduced into the opening to be fixed therein. The sealing means can be constituted by a sealing rib placed in the channel of the preassembled unit, in particular at the end of the channel located the most toward the inside of the housing. The retaining means can be constituted by an abutment surface preventing the stopper from moving toward the outside of the housing when the preassembled unit is fixed to the housing. Another solution consists in designing the retaining means in the form of a washer fixed, preferably welded, to the housing in the extension of the channel, on the side of the face of the bottom oriented toward the outside of the housing, the washer being designed to form, after being fixed, an abutment surface for the stopper in order to prevent the latter from moving toward the outside of the housing when the preassembled unit is fixed to the housing.

The stopper can be made in an elastomeric material, preferably nitrile. In this case, the filling is performed, for example, using a needle passing through the stopper. Rather than an elastomeric stopper, it is also possible to use a stopper of the non-return type. Then, it is no longer necessary to use a needle for the pressurization.

The housing can be constituted by a part in plastic material, preferably thermoplastic, in particular PET, PEN or nylon, or a mixture of these materials. The housing is obtained for example by blow molding, in particular by injection blow molding.

The opening and the retaining means can be arranged at an off-center point of the bottom, and indexing means can then be provided to facilitate the orientation of the housing when closing the opening with a stopper.

The bottom of the housing can have, in its central portion, the shape of a dome curved preferably toward the inside of the housing. The opening and the retaining means can be placed in a recess made in the bottom, in particular in the dome of the bottom. The bottom can also be flat, petaloid in shape (like some water bottles having several lobes forming feet for the bottom) or curved toward the outside, being provided with a pedestal, preferably an add-on pedestal.

The general shape of the housing can have many variations. It can be substantially spherical. Generally, it will preferably have a tubular shape, the first end of which is closed by the bottom provided with the opening and the second end of which is intended to receive withdrawing means, such as a valve. The transverse cross-section of the tubular wall can be circular, for example forming a simple cylinder of revolution. It can also be oval or have more complex shapes (for example, star-shaped). The central portion of the housing is not necessarily cylindrical. The tubular wall can have bulges or recesses to make the housing more aesthetic or more convenient to hold.

The invention also relates to a method for manufacturing a housing according to the invention. This process is characterized by the following steps:

a) making a bottom provided with an opening intended to be closed directly or indirectly by a stopper;
b) making sealing means to ensure sealing between the stopper and the housing when the housing is provided with a stopper; and
c) making retaining means to retain, when the container is pressurized, a stopper closing the opening.

The retaining means, which are in an inactive initial form, are designed to be activated after direct or indirect closing of the opening by a stopper.

The housing is preferably made by blow molding.

During step a), a hole can be made in the bottom, and during step a) or a later step, a channel can be placed around the hole, which channel extends toward the inside and/or toward the outside of the housing. The bottom and the hole can be made in the same step or in two successive steps and/or the hole can be made during installation of the channel.

In a first embodiment of the method, it is preferable to place the stopper and block it directly after manufacturing the housing, to form a unit which is then used for the manufacture of the pressurized containers. It is also possible to install the stopper and deform the deformation zone on the filling line, before pressurization. For this, the following additional steps are provided:

d) introducing a stopper into the housing to directly or indirectly close the opening;
e) then activating the retaining means to form an abutment surface preventing the stopper from coming out of the housing when pressure is exerted inside the housing, the activation possibly consisting in deforming a deformation zone or in fixing, preferably welding, a washer.

Another solution consists in introducing a preassembled unit into the bottom hole, then fixing it to the housing, preferably by welding, in particular by circular friction (spin welding), so that the preassembled unit with the stopper placed therein closes the hole. The preassembled unit is constituted by a channel provided with sealing means and an abutment surface, and a stopper introduced into the channel and cooperating with the sealing means.

The invention is explained below with the aid of two exemplary embodiments. The figures show:

FIG. 1: vertical cross-sectional view of a housing according to a first exemplary embodiment of the invention;

FIG. 2: cross-sectional view of the housing of FIG. 1 at the opening;

FIG. 3: the same view as FIG. 2, a stopper being introduced into the opening;

FIG. 4: the same view as FIG. 3, the deformation means being deformed;

FIG. 5: perspective view of the bottom of the housing;

FIG. 6: a cross-sectional view of a housing according to a second exemplary embodiment of the invention.

The housing (1) of the invention is intended to be closed by a valve and to be pressurized by introducing a propellant gas after filling in order to form a pressurized container such as an aerosol dispenser or a dispenser of pasty products.

For reasons of clarity of the description, use is made of spatial references such as "lower" and "upper". These references relate to the housing when it is in the position shown in FIG. 1. It is self-evident that the housing can be used in other positions.

As shown in FIG. 1, the housing (1) is constituted by a tubular wall (11), a bottom (12) closing the tubular wall in its lower portion, and a neck (13) placed in the extension of the upper portion of the tubular wall. The housing has, with a few exceptions, rotational symmetry about a central axis (A). It could also not be circular, and in particular have an oval or star-shaped transverse cross-section. In the case of the present exemplary embodiment, the generatrix of the tubular wall is a curve so that the tubular wall is not entirely cylindrical. The tubular wall can have any shape adapted to the specific needs of the intended use. It could be simply cylindrical. It could also be ellipsoidal or conical. It could have a more complex shape with bulges and/or recesses. However, it practically always has a certain symmetry about an axis passing through it from the bottom (12) to the neck (13).

The bottom (12) can have, in its central portion, the shape of a dome (121) curved toward the inside of the housing, as in the present example. A hole (122) is made in the bottom, for example in this dome. This hole is intended to be closed directly (FIG. 4) or indirectly (FIG. 6) by a stopper (2) in elastomer (plug) which will be used, after filling, for the pressurization of the container by introduction of a propellant gas, for example using a needle passing through the stopper. This stopper, when it is placed in the housing, has a front face (21) accessible from the outside of the housing. Rather than an elastomeric stopper, a stopper of the non-return type allowing pressurization without using a needle could be provided.

The hole (122) can be made directly during formation of the housing, or it can be made later. It can be surrounded by a channel (123) that extends toward the inside and/or toward the outside of the housing. This channel (123) preferably has the same internal transverse cross-section as the hole. The diameter of the channel is chosen so that the stopper (2) can be introduced therein easily. This channel can be made by introducing a tube into the hole which is then fixed, preferably by welding, in particular by ultrasound welding or by circular friction welding (spin welding), thus arranging the internal channel (and the deformation zone which will be discussed below). The hole (122) and the channel (123), when present, form an opening.

Sealing means are provided in the channel or at the hole to ensure sealing between the stopper and the housing. In a simple version, the sealing means are constituted by the hole and/or by the channel themselves, the dimensions of which are chosen so that the stopper is received therein with a tight fit. This solution can be replaced or supplemented by a sealing rib (124) placed for example at the end of the channel located the most toward the inside of the housing. This sealing rib (124) is of a diameter substantially smaller than the diameter of the stopper (2) so that, even after pressurization, sealing is ensured at least at this rib. The diameter of the rib is chosen to be significantly smaller than that of the stopper, but not too small either, to allow the latter to be introduced easily.

On the outside of the housing, a deformation zone (125) is provided, which is placed either directly adjacent to the hole (122), or in the extension of the channel, if the latter extends toward the outside of the housing. The transverse cross-section of this deformation zone (125) is preferably identical to that of the hole (122) and/or of the channel (123). It can also be chosen larger so that it does not encroach on the hole (122) and/or on the channel (123). This deformation zone is used, after deformation, to hold the stopper (2) in place. Indeed, the obtained retaining effect at the sealing rib (124) makes it possible, under normal conditions prior to pressurization, to hold the stopper (2) in place without risking that it would move, in particular during introduction of the filling needle. On the other hand, after pressurization, a pressure that can exceed 10 bars can prevail inside the container. The friction exerted by the sealing rib (124) on the stopper would not be sufficient to prevent the latter from being forced out of the hole or channel. After the stopper has been introduced into the hole and/or into the channel, this deformation zone is deformed to cover the peripheral edge of the front face (21) of the stopper and thus form an abutment surface against which the stopper comes to bear when the aerosol dispenser is pressurized. In this position, the stopper is always in contact with the sealing means, when there are any. The deformation can be obtained, for example, by hot deformation or by any other suitable means. The deformed zone (126) forms a ring open at its center (127), leaving the center of the front face (21) of the stopper accessible to the pressurizing means, such as a needle. The deformation zone and the abutment surface which results from its deformation are designed so as to be perpendicular to the axis of the channel (123) and/or parallel to the hole (122).

Instead of providing a deformation zone which is deformed after introduction of the stopper, another solution consists in overmolding the abutment on the hole or on the portion of the channel that protrudes out of the housing after introduction of the stopper.

In the example illustrated here, the housing has axial symmetry about the vertical axis (A). The opening, formed by the hole (122) and the channel (123), is made off-center with respect to this axis in order to leave the center of the dome free for the injection, which center of the dome coincides with the axis of symmetry (A). If there is no constraint imposing an injection point at the center of the dome, it is of course possible to place the hole (122) and the channel (123) in line with the axis of symmetry (A).

The channel of the exemplary embodiment presented here extends only toward the inside of the housing and parallel to the axis of symmetry (A). Only the deformation portion protrudes from the dome toward the outside of the housing. The hole (122) and the deformation portion (125) are placed in a recess (128) formed in the dome (121). The wall of the recess at the opening (122, 123) is perpendicular to the axis of symmetry (A). Placing the channel parallel to the axis of symmetry (A) of the housing makes it easier to put the stopper (2) in place during assembly and pressurization, in particular when this pressurization is performed by introduction of a needle through the plug. However, it would also be conceivable for the axis of the channel to be for example perpendicular to the tangent to the dome at the hole (122).

The housing provided with its stopper according to the first exemplary embodiment can be manufactured as follows:

A Manufacture of the housing:
a) manufacturing the housing, for example by blow molding, including making the bottom (12), the tubular wall (11) and the neck (13), an opening constituted by at least one hole (122) being made in the bottom, either directly, or during a subsequent sub-step. The opening can be completed by the channel (123);
b) making sealing means (124) placed in the hole (122) or in the channel (123) if there is one, these sealing means ensuring sealing between the stopper (2) and the housing (1) after the stopper has been introduced; and
c) making, on the side of the face of the bottom (12) oriented toward the outside of the housing (1), a deformation zone (125) placed in the extension, either of the hole (122), or of the channel (123) if there is one protruding out of the housing. The deformation zone is designed to be deformed after introduction of a stopper into the opening, to form an abutment surface (126) for the stopper in order to prevent the latter from moving toward the outside of the housing. This deformation zone constitutes the retaining means when they are in their inactive initial form.

B Putting the stopper in place and blocking it, either directly during the manufacture of the housing, or subsequently, in particular when filling the housing in order to form a pressurized container:
d) introducing the stopper into the hole (122) and/or the channel (123) to close the opening;
e) then activating the retaining means by deforming the deformation zone, blocking the stopper so that it cannot come out after pressurization of the container.

To facilitate the step of introducing the stopper when the opening is not centered on the axis (A), it is possible to provide indexing means making it possible to orient the housing correctly so that the hole and the channel are aligned with the stopper introduction tool. The recess (128) can fulfill this function. However, it is also possible to provide in the bottom (12) a specific recess or projection, not shown in the figures.

In a variant embodiment not shown, deforming the deformation zone (125) is replaced by fixing to the housing, in particular by welding, a washer whose outer diameter is larger than the diameter of the opening (hole and/or channel) and whose inner diameter is smaller than the diameter of the stopper. The peripheral edge of the washer is fixed to the housing around the opening. The inner edge of the washer constitutes the retaining means.

In the second exemplary embodiment shown in FIG. 6, the opening is constituted by a hole (122') into which a preassembled unit is introduced, and then fixed to the housing (1'). The preassembled unit is constituted by a channel (123') provided with a stopper (2'). The channel is provided with sealing means (124'), a deformation zone deformed to form the abutment surface (126'), and an annular fixing surface (129') wider than the channel (123') and the opening (122'). The preassembled unit is fixed to the housing, preferably by welding, in particular by spin welding. The abutment (126') can also be formed at the same time as the channel (123'), even before introduction of the stopper. In particular, the combination formed by the channel (123'), the abutment surface (126'), and the fixing surface (129') can be made in one piece by molding or by fixing, on one end of a channel (123'), a washer (126', 129') whose outer diameter is larger than that of the opening (122') and of the channel (123') and whose inner diameter is smaller than the diameter of the stopper. As shown in FIG. 6, the stopper (2') is located in the opening (122'). However, one could imagine preassembled units for which, in the fixed state of the preassembled unit, only the channel (123') is in the opening, the stopper being offset in the channel to be above or below the opening (122').

The manufacturing process for this variant of the housing can be as follows:

A' Manufacture of the housing:
a') manufacturing the housing, for example by blow molding, including making the bottom (12), the tubular wall (11), and the neck (13), a hole (122') being made in the bottom, either directly, or during a subsequent sub-step;

B' Manufacture of the preassembled unit:
b') making sealing means (124') in the channel (123'), these sealing means ensuring sealing between the stopper (2') and the housing (1') after the preassembled unit has been fixed to the housing and the stopper has been introduced into the channel; and c') making the retaining means placed in the extension of the channel (123'). They form an abutment surface (126') for the stopper to prevent the latter from moving toward the outside of the housing. The retaining means (126') can be obtained by deformation of a deformation zone as in the case of the first exemplary embodiment, wherein this deformation (which is not the actual activation) can be performed after introduction of the stopper in the channel. The retaining means can also be formed directly at the same time as the channel (123'), without the need for the stopper to have already been introduced into the channel.

d1') introducing the stopper (2') into the channel (123') so that it cooperates with at least the sealing means. If it does not yet cooperate with the retaining means, the stopper will be moved until it reaches the abutment (126') at the latest when the container is pressurized.

C' Introduction and fixing of the preassembled unit in the hole d2') Introducing the preassembled unit into the hole (122'). The opening is thus closed indirectly by the stopper contained in the preassembled unit.

e') Fixing the preassembled unit to the housing, for example by welding, preferably by spin welding. This step can be performed before filling the container, or after filling. Welding the preassembled unit to the housing activates the previously inactive retaining means (abutment surface).

As can be seen, whether in the first exemplary embodiment or in the second, a housing (1, 1') is obtained which comprises in particular a bottom (12, 12') comprising:
an opening (122, 123, 122', 123') intended to be closed directly or indirectly by a stopper (2, 2');
sealing means (124, 124') to ensure sealing between the stopper (2, 2') and the housing (1, 1') when the housing is provided with a stopper; and
retaining means (126, 126') to retain, when the container is pressurized, a stopper (2, 2') closing said opening, the retaining means being in an inactive initial form (125) and requiring, to fulfill their function, to be activated (126) after the opening has been closed directly or indirectly by a stopper. The retaining means (126, 126') are distinct from the stopper. Indeed, as long as the container is not pressurized, it would be possible to push the stopper back toward the inside of the container, overcoming the effects of the sealing means (124, 124'). When the stopper (2) is introduced into the hole (122) and/or the channel (123), the opening is closed directly by the stopper. On the other hand, when the stopper is integrated into a preassembled unit, the whole preassembled unit closes the opening: the opening is indirectly closed by the stopper with the interposition of the channel (123').

Likewise, for the process, we find in all cases the steps of
a) making a bottom (12, 12') provided with an opening (122, 123, 122') intended to be closed directly or indirectly by a stopper (2, 2');
b) making sealing means (124, 124') to ensure sealing between the stopper (2, 2') and the housing (1, 1') when the housing is provided with a stopper;
c) making retaining means (125, 126') to retain, when the container is pressurized, a stopper (2, 2') closing said opening,
the retaining means being in an inactive initial form (125);
d) introducing a stopper (2, 2') into the housing to close the opening (122, 123; 122');

e) then activating the retaining means (125) to form an abutment surface (126, 126') preventing the stopper from coming out of the housing.

In the examples presented here, the sealing means and the retaining means are distinct elements. The retaining means mitigate the risk of deformation, even minimal deformation, of the bottom under the effect of the pressure prevailing in the aerosol container. Thus, the sealing means do not have to fulfill the additional function of retaining the stopper against the effect of the pressure prevailing in the container.

The invention is primarily intended for a housing in plastic material. It is particularly advantageous for multi-compartment pressurized containers, in particular in the case of bag valves, double-bag valves, or containers with piston. It is also possible to envision, particularly in the case of high-viscosity products, filling the container via the opening before placing the stopper (or the preassembled unit), and activating the retaining means and pressurizing, thus making it possible to avoid filling via the narrow passages of the valve.

In the present invention, the means to retain the stopper in the housing are initially in inactive form and must be activated after the stopper has been introduced into the housing in order to fulfill their function:

1st variant: the stopper (2) introduced into the hole (122) or the channel (123) would not withstand the pressure in the pressurized container. It is therefore necessary, in order to activate the retaining means, to deform the deformation zone (125) or to fix a washer at the hole (122) or at the lower end of the channel (123) so that the deformed zone (126) or the washer encroaches on the hole and/or on the channel, forming an abutment surface for the stopper (2).

2nd variant: the stopper (2') introduced into the hole (122') via the preassembled unit would be forced out of the pressurized housing if the preassembled unit was not previously secured to the housing, and this would be the case even though the preassembled unit is already provided with the abutment surface (126'). It is only after fixing the preassembled unit on the housing (=activation) that this abutment surface (126') can fulfill its function.

REFERENCES

1, 1' Housing
  11 Tubular wall
  12 Bottom
    121, 121' Dome
    122, 122' Hole
    123, 123' Channel
    124, 124' Sealing rib
    125 Deformation zone
    126, 126' Deformed zone/abutment surface
    127, 127' Center of deformed zone/abutment surface
    128, 128' Recess
    129' Fixing surface
  13 Neck
2 Elastomeric stopper (plug)
  21, 21' Front face of stopper
A Axis of symmetry

The invention claimed is:
1. Housing for a pressurized container, comprising:
an elastomeric stopper;
a bottom comprising:
an opening closed by the stopper;

sealing means to ensure sealing between the stopper and the housing,
wherein a surface of the stopper is exposed to an outside of the housing; and
retaining means to retain the stopper closing the opening while leaving the surface of the stopper exposed to the outside of the stopper when the container is pressurized,
wherein the retaining means are distinct from the stopper and are in an inactive initial form and must, in order to fulfill their function, be activated after the opening has been closed with the stopper.

2. The housing according to claim 1, wherein, before and after activation, the retaining means are located on a face of the bottom located outside the housing.

3. The housing according to claim 1, wherein the opening comprises a hole surrounded by a channel extending toward at least one selected from the group consisting of an inside and the outside of the housing.

4. The housing according to claim 3, wherein the sealing means comprise at least one of the following:
a sealing rib placed in the channel,
a sealing rib placed at the hole.

5. The housing according to claim 1, wherein the retaining means comprises a washer intended to be fixed to the housing in an extension of the opening on a face of the bottom oriented toward the outside of the housing after introduction of the stopper into the opening, the washer being designed to form, after being fixed, an abutment surface for the stopper in order to prevent the stopper from moving toward the outside of the housing.

6. The housing according to claim 1, wherein the opening is provided with the stopper and the retaining means are activated.

7. The housing according to claim 1, wherein the opening comprises a hole, and the housing comprises a preassembled unit separate from the housing, and intended to be introduced into the hole and to be fixed, to the housing, the preassembled unit being constituted by a channel provided with sealing means and retaining means, and the stopper introduced into the channel and cooperating with the sealing means and the retaining means.

8. The housing according to claim 7, wherein at least one of the following:
the sealing means are constituted by a sealing rib placed in the channel,
the retaining means are constituted by an abutment surface preventing the stopper from moving toward the outside of the housing when the preassembled unit is fixed to the housing,
the retaining means are constituted by a washer fixed in an extension of the channel, on a face of the bottom oriented toward the outside of the housing, the washer being designed to form, after being fixed, an abutment surface for the stopper in order to prevent the stopper from moving toward the outside of the housing.

9. The housing according to claim 7, wherein the preassembled unit is introduced into the hole and is fixed to the housing.

10. The housing according to claim 6, wherein the stopper is made in an elastomeric material.

11. The housing according to claim 6, wherein the stopper is of the non-return type.

12. The housing according to claim 1, wherein the housing is constituted by a part in plastic material.

13. The housing according to claim 1, wherein the opening and the retaining means are arranged at an off-center point of the bottom.

14. The housing according to claim 1, wherein the bottom has, in a central portion thereof, a shape of a dome.

15. The housing according to claim 1, wherein the opening and the retaining means are placed in a recess made in the bottom.

16. Method of manufacturing a housing according to claim 1, comprising:
a) making a bottom provided with an opening intended to be closed by a stopper;
b) making sealing means to ensure sealing between the stopper and the housing when the housing is provided with the stopper; and
c) making retaining means to retain, when the container is pressurized, the stopper closing the opening,
wherein the retaining means, which are in an inactive initial form, are designed to be activated after closing the opening by the stopper.

17. The method according to claim 16, wherein, during step a), a hole is made in the bottom.

18. The method according to claim 16, wherein, during step a) or in a subsequent step, a channel is placed around the hole, wherein the channel extends toward the inside and/or the outside of the housing, wherein the hole can be made during the installation of the channel.

19. The method according to claim 16, further comprising:
d) introducing a stopper into the housing to close the opening;
e) then activating the retaining means to form an abutment surface preventing the stopper from coming out of the housing.

20. The method according to claim 16, wherein a preassembled unit, comprising a channel provided with sealing means and an abutment surface, and a stopper introduced into the channel and cooperating with the sealing means, is introduced into the hole, then fixed to the housing, so that the preassembled unit with the stopper placed therein closes the hole.

21. The method according to claim 16, wherein the housing is made by blow molding.

22. The housing according to claim 1, wherein the retaining means comprise a deformation zone made on the bottom in an extension of the opening, on a face of the bottom oriented toward an outside of the housing, the deformation zone being designed to be deformed, after introduction of the stopper in the opening, to form an abutment surface for the stopper to prevent the stopper from moving toward the outside of the housing.

23. Housing for a pressurized container, comprising:
a bottom comprising:
an opening intended to be closed by a stopper;
sealing means to ensure sealing between the stopper and the housing when the housing is provided with the stopper; and
retaining means to retain, when the container is pressurized, the stopper closing the opening,
wherein the retaining means are distinct from the stopper and are in an inactive initial form and must, in order to fulfill their function, be activated after the opening has been closed with a stopper,
wherein the retaining means comprise a deformation zone made on the bottom in an extension of the opening, on a face of the bottom oriented toward an outside of the housing, the deformation zone being designed to be deformed, after introduction of the stopper in the opening, to form an abutment surface for the stopper to prevent the stopper from moving toward the outside of the housing.

24. The housing according to claim 23, wherein the opening is provided with the stopper and the retaining means are activated.

25. The housing according to claim 23, wherein the opening comprises a tubular channel, and the sealing means are adapted to ensure radial peripheral sealing between the tubular channel and a tubular peripheral surface of the stopper when the stopper is positioned in the tubular channel.

26. Housing for a pressurized container, comprising:
 a bottom comprising:
  an opening intended to be closed by a stopper, wherein the opening comprises a tubular channel;
  sealing means to ensure sealing between the stopper and the housing when the housing is provided with the stopper, wherein the sealing means are adapted to ensure radial peripheral sealing between the tubular channel and a tubular peripheral surface of the stopper when the stopper is positioned in the tubular channel; and
 retaining means to retain, when the container is pressurized, the stopper closing the opening,
 wherein the retaining means are distinct from the stopper and are in an inactive initial form and must, in order to fulfill their function, be activated after the opening has been closed with a stopper.

27. The housing according to claim 26, wherein the opening is provided with the stopper and the retaining means are activated.

28. The housing according to claim 26, wherein the sealing means comprise a sealing rib placed in the tubular channel.

\* \* \* \* \*